UNITED STATES PATENT OFFICE.

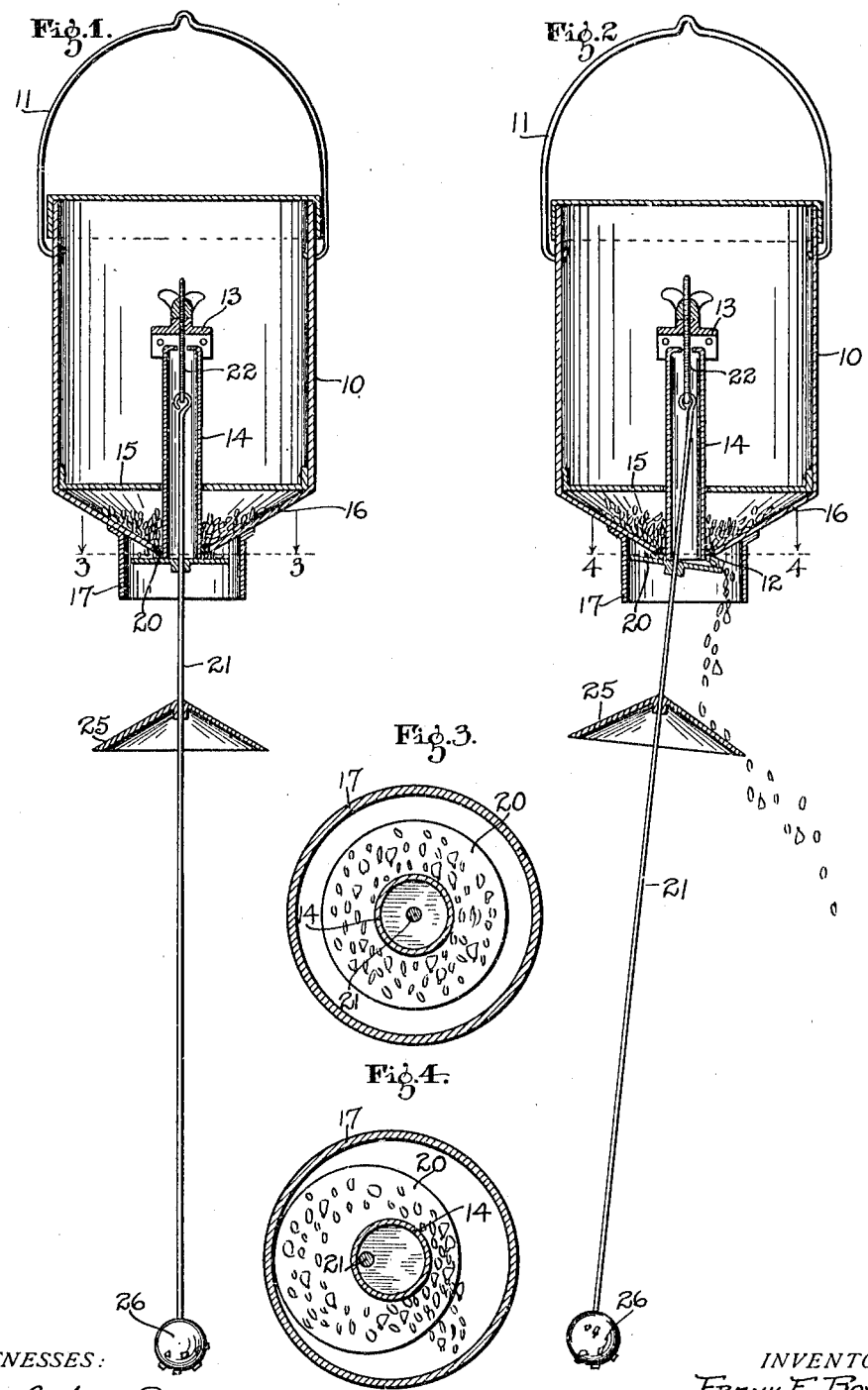

FRANK E. BOWERS, OF INDIANAPOLIS, INDIANA.

POULTRY-FEEDER.

1,118,629.  Specification of Letters Patent.  Patented Nov. 24, 1914.

Application filed November 21, 1913. Serial No. 802,308.

*To all whom it may concern:*

Be it known that I, FRANK E. BOWERS, a citizen of the United States, and a resident of Indianapolis, county of Marion, and State of Indiana, have invented a certain new and useful Poultry-Feeder; and I do hereby declare that the following is a full, clear, and exact description thereof, reference being had to the accompanying drawings, in which like letters refer to like parts.

This invention relates to an automatic poultry feeder in which the discharge of the food stuff is controlled by a pendulum-like rod on the lower end of which food stuff is located at which the poultry can peck and thereby actuate the same for operating the device.

Such devices have heretofore been made, but the object of this invention is to control or regulate the feeding of the device whereby it may be adjusted for increasing or diminishing the feed or for adapting it to different kinds of feed.

A feature of the invention consists in providing a fixed tube and receptacle for the feed with the lower end of the tube open and projecting through but slightly beyond the outlet opening of the feed receptacle, said opening surrounding said tube, and a feed plate on the pendulum rod which lies immediately below the said tube so that said tube and feed plate will coöperate in effecting the feeding. Along with the foregoing is the adjustable mounting of the pendulum rod so as to increase or diminish the feed.

The full nature of the invention will be understood from the accompanying drawings and the following description and claims.

In the drawings, Figure 1 is a central vertical section through the device in normal condition. Fig. 2 is the same in operative condition. Fig. 3 is a section on the line 3—3 of Fig. 1, but on an enlarged scale. Fig. 4 is a section on the line 4—4 of Fig. 2.

In the drawings herein there is illustrated a feed containing receptacle 10 which has a bail 11 whereby it is suspended in a chicken house or yard. It has a conical lower end with a central lower outlet at 12. A bar 13 extends transversely from side to side within the receptacle toward the upper end thereof and it carries a tube 14 extending down through a brace 15 and centrally through the outlet 12 and it is arranged so that there will be an annular discharge opening 12 around said tube through which the corn 16 may escape. A cylindrical extension 17 projects downward from the conical end and surrounds the outlet opening.

The passage of feed through the outlet 12 is controlled by a disk 20 supported on a rod 21 which is pivoted at its upper end to a vertically adjustable screw 22 within the tube 14. Therefore, the lower end of the tube limits the oscillation of the rod and the plate 20 is held slightly below the tube 14 and the outlet 12 so as to close the outlet when the rod 21 is straight or vertical. Said rod has a conical deflecting plate 25 secured to it some distance below the vessel 10 and at its lower end there is a weight or ball 26 which may, if desired, carry grain. The ball may be made of rubber of such consistency that the grains will partially appear in the surface thereof. The device is mounted so that the pendulum ball 26 will hang close enough to the ground for the poultry to pick at the grains on the pendulum ball and thereby give it a swinging movement, as shown in Fig. 2, and thereby cause the discharge of some grain or feed. Therefore, the device is operated only when the chickens are hungry and no excess of feed is supplied by the device.

It is observed that the feed plate 20 is close enough to the lower end of the fixed tube 14 that when the pendulum is swung, the lateral movement of the plate 20 will cause the fixed tube 14 to push the grain off of the feed plate, as seen in Fig. 2. Hence, the fixed tube 14 coöperates with said plate 22 in the operation of the device. By adjusting the feed plate 20 lower, it will discharge correspondingly more feed at each oscillation. Hence, this device can be used with bran or like feed as well as with grain, as the tube 14 will push the bran off the plate 20. To accomplish this, the tube 14 must extend slightly below the lower end of the conical portion of the receptacle 10.

The invention is:

1. A poultry feeding device including a feed receptacle with a circular outlet or opening in its lower end, a tube rigidly mounted within said receptacle and extending down centrally through and beyond said outlet opening, a pendulum rod suspended within said tube and extending centrally below the same, and a horizontal feed plate secured to said pendulum rod in proximity to said feed outlet and to the lower end of said fixed tube, whereby said feed plate and fixed tube will coöperate in controlling the discharge of the feed.

2. A poultry feeding device including a feed receptacle with a circular outlet or opening in its lower end, a tube rigidly mounted within said receptacle and extending down centrally through and beyond said outlet opening, a pendulum rod located centrally in said tube and extending below the same, a screw bolt for suspending said rod arranged so as to be vertically adjusted, and a horizontal feed plate secured to said pendulum rod in proximity to said feed outlet and to the lower end of said fixed tube, whereby said feed plate and fixed tube will coöperate in controlling the discharge of the feed.

In witness whereof, I have hereunto affixed my signature in the presence of the witnesses herein named.

FRANK E. BOWERS.

Witnesses:
J. H. WELLS,
O. M. McLAUGHLIN.

Copies of this patent may be obtained for five cents each, by addressing the "Commissioner of Patents, Washington, D. C."